United States Patent
Tucker

[15] 3,645,686
[45] Feb. 29, 1972

[54] PRODUCTION OF ULTRAPURE SEMICONDUCTOR MATERIALS

[72] Inventor: Thomas N. Tucker, Thomas Township, Saginaw County, Mich.

[73] Assignee: Dow Corning Corporation, Midland, Mich.

[22] Filed: May 4, 1970

[21] Appl. No.: 34,866

[52] U.S. Cl. ................................23/223.5, 23/1, 23/209.9
[51] Int. Cl. ......................................................C01b 33/02
[58] Field of Search ................23/209.9, 209.1, 209.2, 223.5

[56] References Cited

UNITED STATES PATENTS

| | | | |
|---|---|---|---|
| 1,982,821 | 12/1934 | Marsden et al. | 23/209.9 X |
| 3,387,941 | 6/1968 | Murphy et al. | 23/209.9 |
| 2,734,800 | 2/1956 | Brooks | 23/209.9 |
| 2,260,746 | 10/1941 | Hanawalt et al. | 23/209.9 |
| 2,117,497 | 5/1938 | Owens et al. | 23/209.9 X |

OTHER PUBLICATIONS

Myers " Chemical Abstracts" Vol. 69, 1968, 81290u
Kirk-Othmer Encyclopedia of Chemical Technology, Vol. 4, 2nd. Ed., 1964, pages 189– 190

*Primary Examiner*—Edward J. Meros
*Attorney*—Robert F. Fleming, Jr., Laurence R. Hobey, Harry D. Dingman and Howard W. Hermann

[57] ABSTRACT

A method of reducing the contamination of ultrapure materials, such as silicon, with impurities from carbon bodies used in the production of said material s which method comprises pretreating the carbon bodies with water vapor at high temperature whereby the impurities react with the water vapor and either diffuse to the surface of the carbon body and are removed or remain complexed within the carbon body.

7 Claims, No Drawings

PRODUCTION OF ULTRAPURE SEMICONDUCTOR MATERIALS

BACKGROUND OF THE INVENTION

The present invention relates to methods for eliminating the introduction of impurities into ultrapure materials and more particularly relates to methods of eliminating the introduction of impurities inherent in carbon bodies into ultrapure materials such as semiconductor grade silicon, when such carbon bodies are used in producing ultrapure materials.

It is well known in the semiconductor field that in order to produce semiconductor materials of very high resistivity, donor and acceptor impurities must be kept at extremely low levels. This requires that the raw material used for the production of these semiconductors also be ultrapure. It has been found however, that even with raw materials of the utmost purity known to those skilled in the art, the production of materials suitable for some types of devices still seems to depend upon strokes of good fortune. It has recently been discovered that the materials of construction of the reaction chamber in which the semiconductor material is made can have a strong effect upon the purity and therefore upon the resistivity of the material being produced. Steps have been taken, therefore, to use materials of only the ultimate available as far as purity is concerned for the production of such reaction chambers.

In several commercial processes for producing semiconductor grade materials, resistance heating is utilized to obtain the necessary temperatures for chemical vapor deposition of the semiconductor material. Carbon electrodes have been used to make electrical contact within the reaction chamber for such resistance heating. It has recently been suggested that the carbon electrodes themselves may be the source of some impurity contamination within the reaction chamber. Similarly, carbon heaters are used in Czochralski crystal growing operations and carbon firing pins are initially used in some instances for initiating zone refining operations.

In U.S. Pat. No. 2,734,800, there is a discussion of the purification of carbon for use in connection with atomic reactors. In accordance with that patent, halogens such as fluorine may be used to eliminate a substantial amount of impurity contamination by the carbon. It has been found, however, in the semiconductor field that even after such fluorine treatment, contaminants sufficient to substantially effect the resistivity of semiconductor materials still remain within the carbon. Particularly, donor type impurities such as phosphorous still find their way from the carbon electrodes into silicon being produced at about 1,000° C.

SUMMARY OF THE INVENTION

Accordingly, it is an object of the present invention to further eliminate the introduction of impurities into ultrapure materials such as semiconductor grade silicon, for example, from carbon bodies used in the production of such materials. A further object is to provide a method of either eliminating impurities in carbon bodies or chemically complexing such materials in such a way that they will not diffuse out of such materials at elevated temperatures.

In accordance with these and other objects, there is provided by the present invention, a method which comprises the heating of the bodies to a temperature of at least 800° C. and preferably about 1,100° C. and then bathing the bodies with water vapor for a sufficient period of time for the water vapor to penetrate the carbon body. The water vapor may be applied either by itself or in a stream of inert gas such as argon, hydrogen, or nitrogen. Additionally, very small amounts of oxygen can be included in the gas stream. The carbon body is then cooled and protected from the atmosphere until use.

It has been found by this process that the donor concentration in the silicon semiconductor material is substantially reduced, although the exact mechanism by which this reduction occurs is not completely understood. The probable explanation is that water vapor diffuses into the electrodes and etches the grain surfaces forming volatile oxides with the carbon and impurities. The internal surfaces of the carbon electrode are then stabilized and do not contribute impurities when the electrode us again heated during the semiconductor production process. It is to be understood, however, that the above process theory should be taken as a suggestion and not by way of limitation.

DESCRIPTION OF PREFERRED EMBODIMENTS

In accordance with the preferred embodiment of the invention, carbon electrodes are placed in a quartz reaction chamber of high purity and heated to a temperature of at least about 800° C. and preferably to about 1,100° C. The upper temperature limitation is not critical except to the extent that at extremely high temperatures the carbon changes structure or decomposes. After the carbon parts have been brought up to temperature, a flow of water vapor is introduced into the furnace for a sufficient period of time to allow the water vapor to completely diffuse through the carbon. It is to be understood that this time, will of course, vary with the thickness of the part and the temperature being used.

If desired, the water vapor can be carried into the reaction zone by means of a stream of inert gas such as, nitrogen, hydrogen, or argon. Water vapor can conveniently be added to these gases by bubbling the gases through liquid water as they are fed into the reaction chamber. When this is done at room temperature it results in a water partial pressure of about 10 mm. Hg in the reaction chamber.

The water used, of course, should also be extremely pure, at least insofar as donor and acceptor elements are concerned. Small amounts of oxygen i.e., up to 100 parts per million can also be added to the gas feed and in some instances aids in the process. After gas flow is maintained for a sufficient time to allow the water vapor to completely diffuse through the carbon body, the gas flow is cutoff and the body is allowed to cool. Immediately upon cooling the carbon body should be placed in a sealed pouch to prevent further contamination by the atmosphere. A polyethylene bag which may be heat-sealed is suitable for this purpose. The pouch should not be reopened until immediately before use.

It should be realized that significant improvement in contamination may be obtained without treating for sufficient time for the water vapor to penetrate completely through the graphite. It is postulated that the water vapor diffuses into the electrodes and etches the grain surfaces. This forms volatile oxides with the carbon and with impurities. The internal surfaces of the carbon electrode are then stabilized either by virtue of the oxides being volatilized or being complexed into the carbon so that they will not diffuse out upon further heating. Thus, when the electrode is later used in production of the semiconductor materials, the impurities which were in the carbon bodies prior to treatment are prevented from contaminating the semiconductor materials. It should be noted, however, that while the results obtained by carrying out the aforedescribed process appear to justify the above postulated explanation, it may be that other explanations are proper and it should be understood that applicant does not wish to be bound by his theory.

In any event, analysis of silicon produced after treatment of the electrodes shows significant improvements in resistivity of the silicon indicating a substantial reduction in impurities. It is known that phosphorous is a primary donor impurity and experiments have shown that phosphorous concentration in the silicon produced is substantially reduced by use of the above process. Other impurities such as boron, arsenic and antimony may also have their effects reduced in this manner.

The process is a relatively simple one and is economic to perform. While it has been described particularly with reference to electrodes for forming semiconductor materials such as silicon by chemical vapor deposition, it should be realized that it can be used to eliminate contamination from other types of carbon bodies as well. For example, the carbon susceptors used in Czochralski crystal growing operations and the firing pins used for initiating zone refining operations can also be purified, in effect, in this manner. The following specific examples will better enable those skilled in the art to carry out the invention set forth hereinabove and will serve as an indication of the results which can be obtained by this process.

EXAMPLE 1

A series of tests were run on identical carbon electrodes for use in identical silicon deposition reactors. In each case treated electrodes were used at the same time as untreated electrodes using identical conditions including the same feed stream to produce silicon by chemical vapor deposition from trichlorosilane, so that comparisons between treated and untreated electrodes could be made. Treatment on each of the following electrodes consisted of bubbling either hydrogen or argon through water and carrying it into a quartz furnace in which the electrodes were heated to 1,100° C. All electrodes (both test and control) had been pretreated by the manufacturer with fluorine to eliminate a substantial number of impurities. The gas was introduced into the furnace at a flow rate of 5 liters per minute in all cases, and flow was maintained for two hours to insure complete diffusion of the water vapor through the carbon electrodes. Table 1 indicates the results of this treatment together with the results obtained using control electrodes which had been similarly fluorine pretreated by the manufacturer and subjected to a vacuum outgassing prior to insertion into the silicon reactor, to eliminate any possible contamination of the silicon produced by gases contained within the carbon.

TABLE 1

Effects of Wet $H_2$ or Wet Ar Treatment at 1,100° C. on Carbon Electrode Purity as Indicated by Donor Level in Deposited Silicon

| Run | Gas | Donor ppba | Control Donor ppba |
| --- | --- | --- | --- |
| A | Wet Ar | 0.86 ppba | 3.53 ppba |
| B | Wet Ar | 0.54 | 1.93 |
| C | Wet Ar | 0.67 | 2.67 |
| D | Wet Ar | 0.55 | 1.36 |
| E | Wet $H_2$ | 0.44 | 2.31 |
| F | Wet $H_2$ | 0.13 | 1.24 |
| G | Wet $H_2$ | 0.06 | 0.30 |

Thus, Table 1 shows the significant improvement that can be obtained using the present invention. The donor impurity levels are given in parts per billion atomic (ppba). Similar results are obtainable when pure water vapor is used in place of the wet argon or wet hydrogen disclosed above, or when wet nitrogen is used in place of those gases. Similarly, the addition of up to 100 parts per million oxygen provides comparable results, although some etching of the carbon occurs. Variation of the temperature between 800° and 1,500° C. likewise produces similar results to those obtained in Table 1.

Obviously other modifications of the present invention will become obvious to those skilled in the art from a consideration of the foregoing. Therefore, within the scope of the appended claims, the above invention may be practiced otherwise than as specifically described hereinabove.

That which is claimed is:

1. In a process for the production of ultrapure semiconductor material in apparatus wherein said semiconductor material is contaminated with impurities from carbon bodies, the method of reducing said contamination which comprises pretreating said carbon bodies with an atmosphere consisting essentially of steam at a temperature of at least 800° C.

2. In a process for the production of ultrapure semiconductor material wherein said semiconductor material is contaminated with impurities from carbon bodies, the method of reducing said contamination which comprises pretreating said carbon bodies with an atmosphere comprising a gas chosen from the group consisting of argon, hydrogen and nitrogen at a temperature of at least 800° C., said gas having been saturated with water at room temperature prior to subjecting the bodies to said atmosphere.

3. The method as defined in claim 2, wherein said atmosphere further includes up to 100 parts per million (atomic) of free oxygen.

4. The method as defined in claim 3, wherein said body is heated to about 1,100° C. while it is subjected to said atmosphere.

5. The method as defined in claim 2, wherein said body is heated to about 1,100° C. while it is subjected to said atmosphere.

6. The method as defined in claim 1, wherein said semiconductor material is silicon.

7. The method as defined in claim 1, wherein said carbon bodies are electrodes.

* * * * *

U.S. PATENT OFFICE
UNITED STATES PATENT OFFICE
CERTIFICATE OF CORRECTION

Patent No. 3,645,686            Dated: February 29, 1972

Thomas N. Tucker

It is certified that errors appear in the above-identified patent and that said Letters Patent are hereby corrected as shown below:

Col. 2, line 3, the word "us" should read --is--.

Col. 4, line 41, the numeral "1" should read --2--.

Col. 4, line 43, the numeral "1" should read --2--.

Signed and sealed this 22nd day of August 1972.

(SEAL)
Attest:

EDWARD M. FLETCHER, JR.
Attesting Officer

ROBERT GOTTSCHALK
Commissioner of Patents